H. O'NEILL AND S. H. PAYNE.
SLIDE RULE.
APPLICATION FILED AUG. 24, 1917.
1,382,011.
Patented June 21, 1921.
2 SHEETS—SHEET 1.
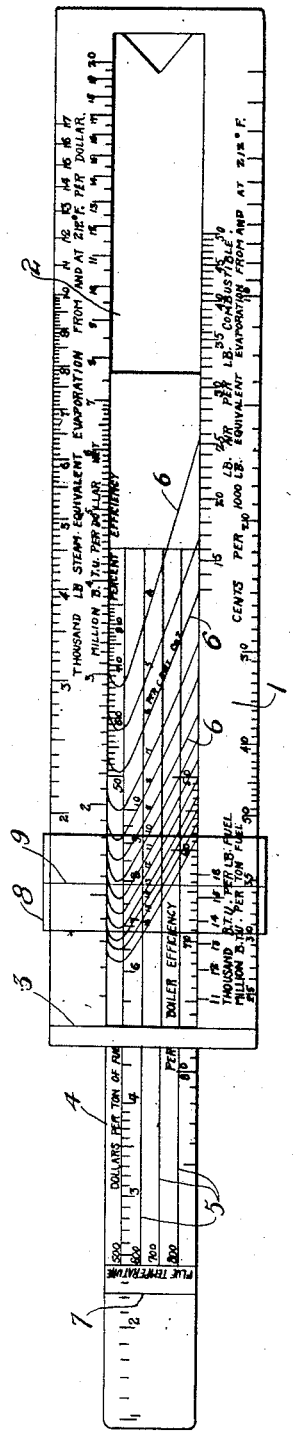
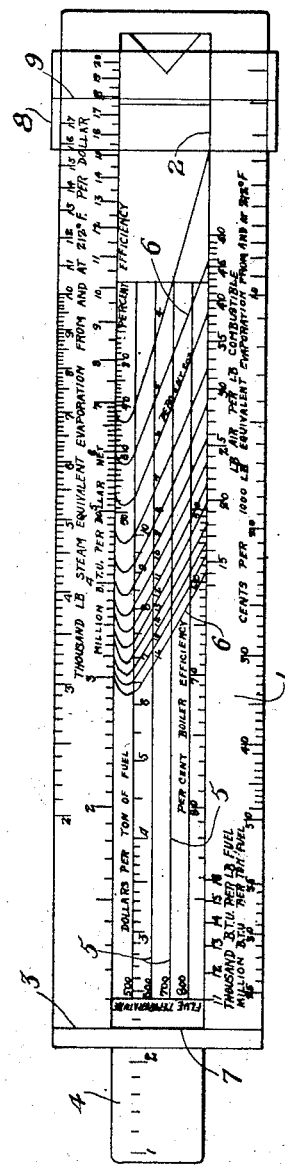
INVENTORS
Haylett O'Neill
Stephen H. Payne
BY
A. Payne-Smith
their ATTORNEY H. O'NEILL AND S. H. PAYNE.
SLIDE RULE.
APPLICATION FILED AUG. 24, 1917.
1,382,011.
Patented June 21, 1921.
2 SHEETS—SHEET 2.
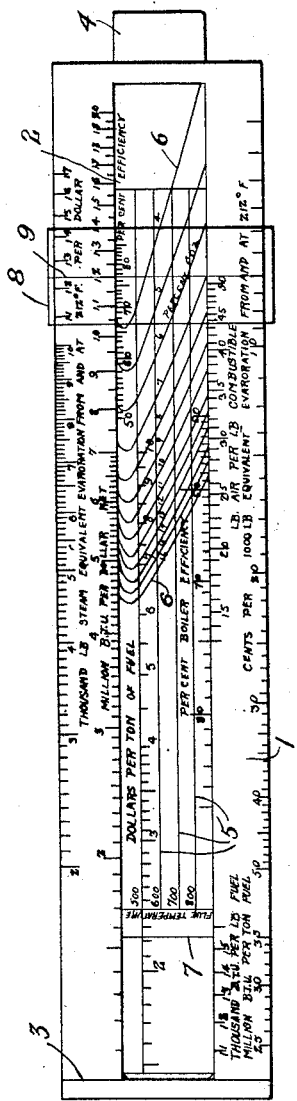
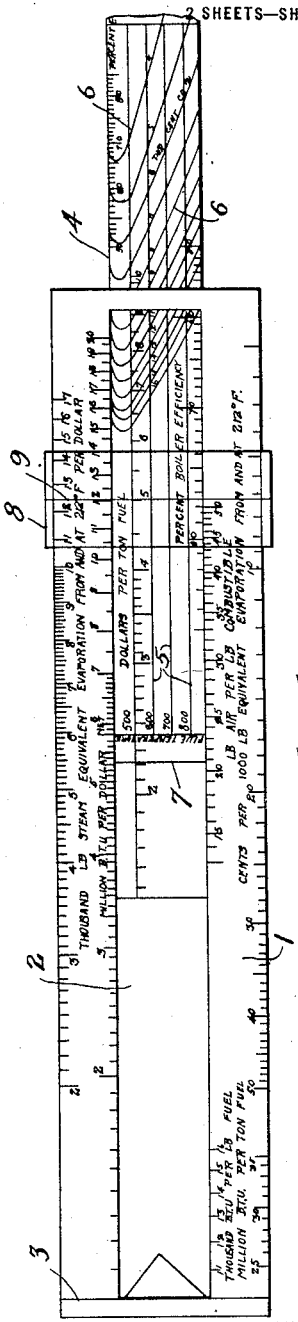
INVENTORS
Haylett O'Neill
Stephen H. Payne,
BY
A. Payne-Smith
their ATTORNEY

UNITED STATES PATENT OFFICE.

HAYLETT O'NEILL, OF LARCHMONT, AND STEPHEN H. PAYNE, OF BROOKLYN, NEW YORK.

SLIDE-RULE.

1,382,011.  Specification of Letters Patent.  Patented June 21, 1921.

Application filed August 24, 1917. Serial No. 188,059.

*To all whom it may concern:*

Be it known that we, HAYLETT O'NEILL and STEPHEN H. PAYNE, citizens of the United States of America, residing at Larchmont, county of Westchester, State of New York, and Brooklyn, city of New York, county of Kings, State of New York, respectively, have invented certain new and useful Improvements in Slide-Rules, of which the following is a specification.

Our invention relates to that class of mechanical devices by the manipulation of which the approximate results of a series of mathematical calculations can be promptly reached, which devices are generally known as "slide rules." More specifically our invention comprises a device of this character having such construction, markings and notations that the approximate results of a series of steam boiler tests assumed to be made under certain given standard conditions can be instantly obtained without further mathematical computations being required.

Our invention is also useful to designers of steam plants in that by a reversal of some of the processes used as above suggested in determining the results of the operation of such a plant and by assuming any particular desired result, our invention will then give at once certain general dimensions or factors required in a plant to produce such result under the assumed conditions.

The main thing to be determined in any test of a steam plant is the efficiency of the plant, *i. e.* the proportion or percentage of the total available heat units of the fuel consumed realized in the steam produced. Another thing in which the user is interested is the cost of fuel consumed per unit of steam output, or the complementary figures as to the amount of steam evaporated per unit cost of fuel. Under standard practice the above determinations for any given plant can only be reached by an elaborate set of tests on that plant requiring the services of a staff of trained men working for several hours or days to measure the fuel, water and air consumed, the steam produced, the moisture in the coal, radiation losses and other factors, as well as the constituents of the fuel and the temperature and composition of the flue gases. By the use of our invention the efficiency and cost of operation of the plant can be read from the slide rule as soon as the B. T. U.'s of the fuel, cost of fuel per unit quantity, the temperature of the flue gases and the percentage of $CO_2$ in said gases are known. The first above mentioned factor, the heat units per unit of fuel, can be cheaply determined in one of the laboratories carrying on the business of making such tests, and in many cases is practically fixed in the specifications of the contracts of purchase, and warranted by the merchant from whom the fuel is bought. The temperature of the flue gases can be determined by use of a simple pyrometer and the per cent. of $CO_2$ therein can be found by comparatively simple standard methods of test which are well known to engineers.

The general principles involved in the laying out of our slide rule are, first, the calculation of losses involved in boiler plant operations, from which the per cent. of loss and, inversely, the per cent. of efficiency can be determined, and, second, the division of these losses into two classes, (*a*) the larger ones which vary directly as does the temperature and inversely as does the $CO_2$ content of the flue gases, and (*b*) the smaller ones which are practically constant for standard types of boiler plant. The variations in these last mentioned losses which do occur are partially indicated by variations in flue gas temperatures. Losses of this class (*b*) constitute such a small part of the sum total of losses that if in a given case the constants assumed were from 20% to 30% out of the way, the resultant error in the total efficiency determination would not exceed 2%.

In class (*a*) come the loss of heat units carried away by the dry gases in the stack, the loss resulting from partial combustion which produces $CO$ instead of $CO_2$, and the heat units consumed in heating water vapor contained in the air supplied for combustion from the temperature of the grate intake to the temperature of the flue gases. In class (*b*) come losses such as those due to radiation from exposed boiler and firebox surfaces, evaporation of moisture present in the fuel, heat absorbed by the formation of $H_2O$ from any free hydrogen in the fuel, and failures of combustion due to premature cooling of the combustible gases, the presence of unburned combustible matter in the refuse, or other imperfect working of the plant.

In laying out the slide rule the class (*b*) losses for different flue gas temperatures are assumed as the average of the previous determination in a number of well conducted tests on standard steam plants. These results at different flue temperatures are plotted cumulatively, the ordinates of the points forming the curves or lines graphically presenting the results being in terms of B. T. U.'s of fuel and the abscissæ being in terms of flue temperatures. The losses due to moisture and hydrogen in the coal, and to unconsumed combustible in the refuse, increase slowly with, and in nearly direct proportion to, the increase in the flue temperatures, so that these losses are represented by slightly inclined straight or nearly straight lines. The losses due to radiation would be a hundred per cent. at a flue temperature just equal to steam temperature (because no heat would then pass to the steam except such as was needed to replace reduction of its temperature by radiation) and then decrease in a hyperbolic curve as the flue temperatures increase.

The class (a) losses are plotted in the same way; those corresponding to each percentage of $CO_2$ in the flue gases being represented by a curve the ordinates of which are B. T. U. losses, and the abscissæ of which are the flue gas temperatures.

When these results in classes (a) and (b) for $CO_2$ percentages within practically occurring limits are added together graphically a series of distorted curves are produced, the ordinates of which quite accurately represent the B. T. U. losses per unit quantity of fuel in a boiler plant run at the flue gas temperatures represented by the abscissæ and with a $CO_2$ percentage in the flue gases corresponding to that assumed in plotting any particular curve.

If then these curves are laid out on the slide of a slide rule with their abscissæ (flue temperatures) at right angles to the longitudinal dimension of said slide, and one or more logarithmic scales of percentages of boiler efficiency be laid out along the line of the ordinates, or parallel thereto, we find that by laying out a scale of B. T. U. contents of fuel on the casing of the slide rule, we can by manipulation of the slide and a marker sliding lengthwise of the casing, cause the rule to indicate the efficiency of any standard boiler operating on fuel of a given B. T. U. value, and producing flue gases at a determined temperature and $CO_2$ content. Certain further determinations of cost of fuel per unit of output and amount of air consumed per unit of fuel can be made on our slide rule by the use of additional scales as hereinafter explained.

The best form of apparatus at present known to us embodying our invention is illustrated in the accompanying two sheets of drawing in which—

Figure 1 shows the parts in the position to determine the efficiency of a plant when operated on fuel of a given B. T. U. value, with flue gases going off at a given temperature and having a given $CO_2$ content.

Fig. 2 shows the parts in position to determine the number of pounds of air per pound of fuel burned necessary to cause a plant to operate with a given flue temperature and $CO_2$ content of flue gases.

Fig. 3 shows the parts in the first position assumed in the process of determining the fuel cost of operation when a plant is operated on fuel of a given B. T. U. value, and at a given efficiency, and Fig. 4 shows the parts in the second and final position for such purpose, i. e. the position at which the fuel costs can be read by the observer.

Throughout the drawings like reference characters indicate like parts. 1, is the casing of the rule which has a long slot 2, in its face ending at the left hand at the casing index line 3. Upon the upper and lower sections of the face of the casing are graduated scales as shown, which give data or represent assumed data, as indicated by the descriptive matter annexed to them.

4, is a slide movable endwise in casing 1, having a series of horizontal lines 5, 5, representing different degrees Fahrenheit of temperature of flue gases, a series of curved lines 6, 6, representing different $CO_2$ contents of flue gases, all as indicated in the descriptive matter annexed thereto in the drawing, a cross line 7, for use as an index line in a manner to be hereinafter explained, and three longitudinally extending graduated scales, as shown.

8, is a marker sliding longitudinally on the casing 1, preferably having its face of glass or other transparent material on which is marked an index line 9, extending crosswise of the rule.

The relative graduations of the various scales and the loci of the $CO_2$ curves 6, 6, have been determined in the manner hereinbefore described. The method of use of our improved slide rule is the following:

To determine the combined boiler and furnace efficiency of a given plant operating on a given grade of coal the user first sets the marker 8, so that its index line 9, coincides with that point of the scale marked "Thousand B. T. U. per lb. fuel" which corresponds to the fuel being used. That is to say, if the specifications under which the fuel was bought called for a 15500 B. T. U. value, or if the laboratory tests of the fuel give that result, the marker would be set with index line 9, across this scale half way between the graduations marked 15 and 16. The next step is to move the slide 4, until the point of intersection of the $CO_2$ curve which corresponds to the $CO_2$ content of the flue gases as shown by test of this particular plant and the line of flue gas temperature as also determined by test, comes under marker index line 9.

Then the reading on the lower slide scale marked "Per cent. boiler efficiency" indicated by casing index line 3, gives the boiler efficiency at which the plant is running.

Thus, assuming that the flue gas tests made at this plant showed a temperature of 700 degrees and a $CO_2$ content of 15 per cent., the pulling out of slide 4, to bring the intersection of the lines so marked thereon under marker index line 9, would cause casing index line 3, to register 77 on the lower "boiler efficiency" scale, all as shown in Fig. 1, *i. e.* the boiler efficiency is shown to be 77 per cent.

To find the amount of air used in the operation of a steam plant per pound of combustible, the slide 4, is placed so that its index line 7, coincides with the index line 3, of the casing, and the desired result can then be obtained by noting the point at which the $CO_2$ line for that plant intersects the graduated scale marked "Lb. air per lb. combustible" on the upper edge of the lower section of the casing face. Thus in the case assumed above where tests of the flue gases has shown a $CO_2$ content of 15% the reading on our slide rule, as shown in Fig. 2, gives an air consumption of 16 pounds per pound of combustible.

To determine operating costs per unit of steam output one must have the cost of combustible per unit of heat giving capacity and the efficiency of the plant, as these are the factors that enter into the computation. The first factor is a function of the cost per unit weight of the fuel and the B. T. U. value thereof. The first of these subfactors is known from the records of the purchasing department. The second is shown by test or by specifications. The efficiency can be determined by use of our slide rule, as above described. To find the operating fuel costs having these data, the user first sets slide 4 so that its index line 7, comes opposite the B. T. U. value of the fuel used, and next moves the marker till index line 9, registers with that graduation of the "per cent. efficiency" scale on the upper position of the slide, which corresponds to the previously determined efficiency of the plant. The slide 4, is then moved again till the marker index line 9, is over that graduation of the scale on the slide marked "Dollars per ton of fuel" which corresponds to the price of the fuel being used. Then the readings on the scales on the casing face marked "Thousand lb. steam equivalent evaporation from and at 212° F. per dollar," "Million B. T. U. per dollar net" and "Cents per 1000 lb. equivalent evaporation from and at 212° F." in line with the index line 7, on slide 4, give the cost data required.

Thus, assuming the same data as before, and that the fuel cost is five dollars a ton, the slide rule would be operated as follows: Slide 4, would be placed so that its index line 7, registers midway between the graduations "15" and "16" of the "thousand B. T. U. per lb. fuel" scale and the marker moved so that its index line 9, comes over the graduation "77" of the upper scale on the slide marked "Per cent. efficiency" all as shown in Fig. 3. Then, on moving the slide 4, till the graduation "5" of its "dollars per ton of fuel" scale comes under the index line 9 of the marker the index line 7 of the slide will point to the fourth graduation to the right of the one marked "5" in the scale marked "Thousand lb. steam equivalent evaporation from and at 212° F. per dollar," which means that for every dollar's worth of fuel burned the plant develops an evaporative capacity equivalent to that necessary to evaporate 5400 pounds of water from and at 212° F. The corresponding reading on the lower scale of the upper section of the casing face shows that every dollar's worth of fuel burned in the plant produces 5,300,000 British thermal units of heat in steam evaporated, and the reading on the complementary scale on the lower section of the casing marked "Cents per 1000 lb. equivalent evaporation from and at 212° F." shows that the fuel cost of evaporating an amount of steam in this plant equivalent to boiling away 1000 pounds of water at atmospheric pressure is a little over 18 cents, all as shown in Fig. 4.

The labor saving qualities of our invention are evident from the above description. Many large corporations spend thousands of dollars every year in recurring elaborate tests of their numerous steam plants to determine whether they are running at proper efficiency. With our slide rule one man can do this work with a pyrometer, a $CO_2$ apparatus and the data as to the B. T. U. values of the fuels used. The determination by the slide rule of the amount of air being used will at once suggest the proper modification of blower capacity or chimney connections if the figures are outside of proper limits. The ready determination of fuel costs is of obvious value. For designing engineers our invention gives readily the data as to all consumption and $CO_2$ content necessary to produce a given efficiency so that if one is called upon to design a plant which must be warranted to operate at or above such given efficiency he can tell at once the blower or chimney capacity required and make his plans accordingly, and if an automatic stoker is to be used he can call for a warranty from the manufacturers that their apparatus shall in operation produce flue gases with the necessary $CO_2$ content.

Various changes can of course be made in the details of construction herein described and shown without changing the substance of the invention. Also certain subcombinations of the elements shown can be utilized to advantage for certain purposes without employing the entire combination of all the elements present in the most perfect embodiment of the invention.

Having described our invention, we claim:

1. In a slide rule for determining the efficiency of steam plants, and other facts relating thereto, the combination with a casing having a cross index line, a slotted face and, along the margin of said slot, a scale representing different values of combustible per unit of fuel, and a slide mounted in said slot and having on the slide face a series of longitudinally extending parallel lines representing different flue temperatures, a series of curved lines intersecting these parallel lines and representing the summation of heat losses in a standard boiler plant which is producing the percentages of $CO_2$ in said flue gases under varying conditions as designated on said lines, and a graduated scale, parallel to the flue temperature lines, representing the percentages of efficiency at which boilers are being operated, of a marker adapted to slide longitudinally on the casing, whereby upon placing the marker over the graduation on the casing scale representing the value of combustibles, in an assumed fuel, and moving the slide until the intersection point of the line representing a given flue temperature and of the curve representing a given $CO_2$ percentage, comes under the marker, the graduation on the slide representing the efficiency of a standard boiler operating under conditions so assumed will appear opposite the index line on the casing.

2. In a slide rule for determining the operating costs of steam plants and other facts, the combination of a casing having a slotted face and parallel to the margins of said slot a scale representing different values of combustibles per unit of fuel and other scales representing the results of performances per unit cost of fuel, a slide mounted in the slot in said casing having a cross index line on its face together with a longitudinally extending scale representing various efficiencies at which a boiler may operate and a second scale representing costs of fuel per unit employed, and a marker having a cross index line mounted and sliding over the casing and first mentioned slide, whereby when the slide is moved in the casing until its index line comes opposite the combustible value in the casing scale which corresponds to a given fuel, the marker next moved until its index line registers with an assumed percentage in the efficiency scale on the slide, and the slide is finally moved until the index line on the marker registers with that graduation on the scale of unit costs of fuel on the slide corresponding to that of the given fuel, the index line on said slide will then register with the graduations in the scales on the casing which show the results of performances per unit of fuel cost of which a boiler having the assumed efficiency and using the given fuel would be capable.

HAYLETT O'NEILL.
STEPHEN H. PAYNE.

Witnesses:
 FRED A. KUNEMUND,
 JOSEPH DUBOV.